United States Patent [19]

Jacobstein et al.

[11] Patent Number: 4,618,229
[45] Date of Patent: Oct. 21, 1986

[54] BIFOCAL CONTACT LENS

[75] Inventors: Benjamin L. Jacobstein, Coral Gables; Thomas J. Mestrits, Coconut Grove; Murray Miller, Miami, all of Fla.

[73] Assignee: Bausch & Lomb Incorporated, Rochester, N.Y.

[21] Appl. No.: 516,489

[22] Filed: Jul. 22, 1983

[51] Int. Cl.$^4$ .......................... G02C 7/04; G02C 7/06
[52] U.S. Cl. .................................... 351/161; 351/177
[58] Field of Search .............. 351/161, 160 R, 160 H, 351/162, 177

[56] References Cited

U.S. PATENT DOCUMENTS

| | | | |
|---|---|---|---|
| 3,212,097 | 10/1965 | Adler | 351/160 R |
| 3,937,566 | 2/1976 | Townsley | 351/160 X |
| 4,297,008 | 10/1981 | Woodford | 351/160 R |
| 4,324,461 | 4/1982 | Salvatori | 351/161 X |
| 4,508,436 | 4/1985 | Sitterle | 351/160 H |

OTHER PUBLICATIONS

"Dimple Contact Lenses", A. Tajiri—American Journal of Optometry & Archives, vol. 42, #4; 4/1965, pp. 248, 249.

Primary Examiner—John K. Corbin
Assistant Examiner—Scott J. Sugarman
Attorney, Agent, or Firm—DeWitt M. Morgan; John S. Norton

[57] ABSTRACT

A ballasted multifocal contact lens has a vent for releasing constrictive pressure provided in its lower and ballasted portion. The vent has a surface which tapers from the anterior surface toward the posterior surface to allow the lens to be positioned below the inferior lid. A stabilizing portion is formed on the lens adjacent each side of the vent. The stabilizing portions engage the inferior lid and adjust the lens should it be rotated off axis.

9 Claims, 16 Drawing Figures

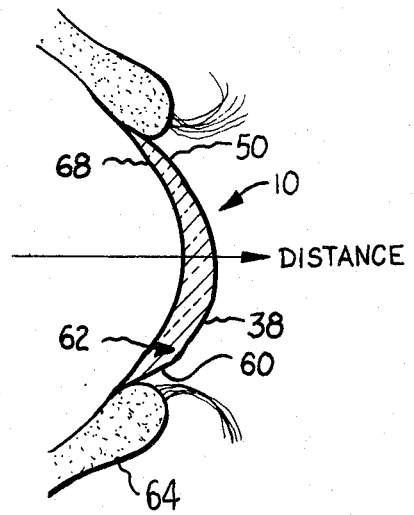
FIG. 8
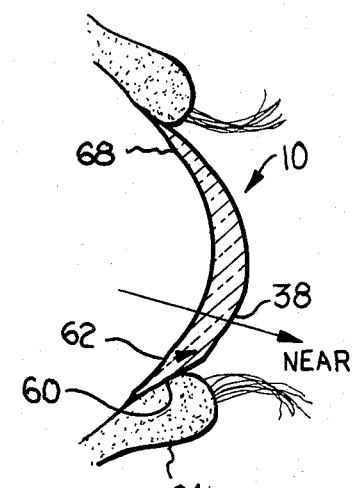
FIG. 9
FIG. 7a
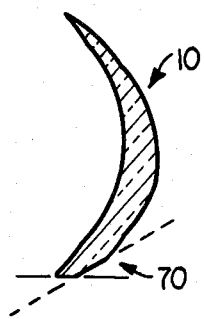
FIG. 7c  FIG. 7e
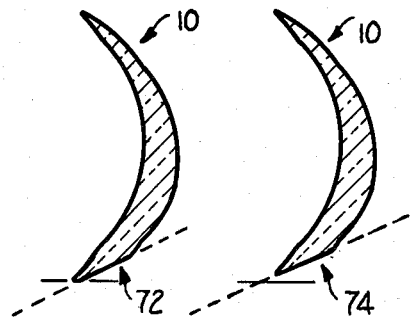
FIG. 7g  FIG. 7h
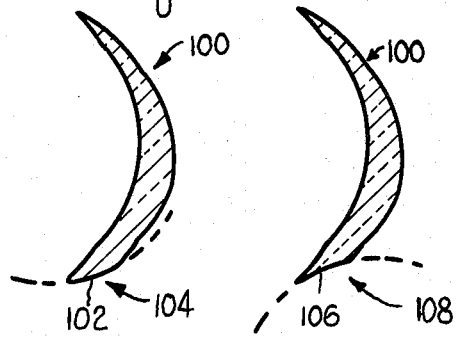
FIG. 7b
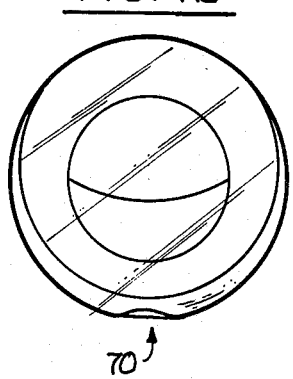
FIG. 7d
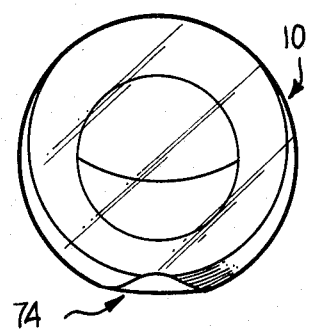
FIG. 7f
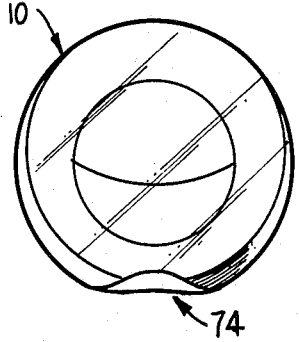

BIFOCAL CONTACT LENS

DESCRIPTION OF THE PRIOR ART

As a person grows older, the natural lens of the eye begins to crystalize and lose its elasticity. As this condition progresses the eye loses its ability to accommodate for objects which are near. The objects, consequently, remain blurry and out of focus. This condition is referred to as presbyopia. In order to correct this condition it is necessary to provide a corrective lens which accommodates for the eye's weakness and properly focuses the light rays upon the retina.

There are several ways to accomplish this correction. A simple solution for people who require correction only for near work is the use of reading glasses which are put on and taken off when close work is required. For people who require correction for both near vision and far vision, dual vision, or bifocal, corrective eye glasses have been prescribed for quite some time. Bifocal eye glasses provide proper correction for distant vision through one segment of the lens, while correction for near vision is achieved through a second segment.

For various and sundry reasons many people do not care to wear ophthalmic frames to correct their vision and have taken to wearing contact lenses. Presently, all bifocal contact lenses function either under the principle of simultaneous vision or of alternating vision. Bifocal contact lenses which feature simultaneous vision provide a distance zone correction on the lens which is smaller than the pupil diameter of the eye. The distance zone is generally surrounded by an area for near correction. The wearer of this type of lens is simultaneously viewing objects through both the near correction and the distant correction portions of the contact lens. The brain receives the visual messages from the eye and then selects the proper image on which to focus while suppressing the other image. However, although the image upon which the eye is focused is clear, some blurring is always present. This is caused by the light passing through the out-of-focus zone. A great many presbyopic people cannot accept this type of corrective contact lens. Other contact lenses function according to the alternating vision principle. The annular type of alternating vision lens usually has a band of near vision power surrounding a center of distance vision power correction. Crescent segmented alternating vision lenses have a distance portion above and a crescent-shaped near power segment immediately below. In either case, the lens must move on the eye with respect to the horizontal meridian in order to achieve proper focussing through the near zone and then to resume its initial position for distance vision. To accomplish this, the lens is generally provided with some sort of ballasting, such as the lens being heavier at its lower portion. One common method to produce such a lens is by manufacturing it with a wedge or prism shape which produces the desired thicker, and thus, heavier, portion at the bottom of the lens. In many instances, and especially with bifocal lenses, both truncation and ballasting may be used simultaneously. In other instances, contact lenses may be ballasted through the incorporation of a heavier material into the lower portion of the lens.

The ballasted lenses, briefly described above, generally help to maintain the contact lens in a proper inferior orientation on the eye when the wearer is looking straight ahead through the distance portion. As the wearer shifts gaze from distance to near, the eye moves downwardly. The enlarged portion of the lens whether from ballasting, truncation, or both, encounters the lower eyelid and is forced upwardly a predetermined amount so that the near vision portion is properly positioned before the pupil. Near vision lens orientation is thereby provided. When the wearer shifts the field of view back to distance gaze, the lens, because of the ballasting, migrates vertically on the eye and resumes its distance position.

The ballasted and truncated lenses described above, while satisfactory for some wearers, generally have several inherent drawbacks which make them less than desirable for a substantial portion of the number of people who are potential bifocal candidates. Some wearers absolutely cannot wear the conventionally ballasted lens as it irritates their lower (inferior) lid and becomes quite uncomfortable and painful. Others cannot wear the conventionally ballasted lens as the ballasted region frequently will be caught and briefly held by the upper (superior) lid upon blinking. As the upper eyelid opens from the blink sequence the lens may be caused to rotate off axis. The rotation may be either in the temporal or nasal direction. The rotational displacement results in diplopia and visual acuity suffers substantially. The patient, of course, cannot accept a contact lens which would give such poor results.

Conventionally truncated lenses, depend upon the blunt lower edge of the lens to rest against the sensitive lower lid margin to move the lens as the gaze is lowered from distance to near vision. It will be appreciated, therefore, that the height of the near segment with respect to the pupil is most critical as it depends solely on the movement induced by the engagement with the lower lid for proper positioning. It is well known that the position of the lower lid varies from patient to patient with respect to the lower limbus of the cornea. Some may have high inferior lids while others have low inferior lids. In instances such as these, many patients cannot be properly fitted as the lens will either move too much or too little to properly position the add portion on the eye. To compensate for this serious problem, it becomes necessary to maintain a substantial inventory of lenses in order to have on hand the lens with the correct segment height to lens center line relationship.

Translating type bifocal lenses which were fitted to patients in the past were generally prism ballasted and/or truncated flat. Dr. Robert B. Mandell, a noted scholar and Professor of Physiological Optics and Optometry at The School of Optometry, University of California at Berkeley writes on p. 721 of "Contact Lens Practice", (3rd Edition) ". . . the shape of the truncation is important. The truncation should be nearly flat at the bottom with rounded corners. It should be rounded evenly on the front and back sides. If the truncation tapers toward the front surface, it will rub against the lower lid and cause severe discomfort. If the truncation tapers toward the rear surface, the lens will slip beneath the lower lid and not be supported in its proper position".

It will be apparent that practitioners and scholars, such as Dr. Mandell, have accepted, as fact, that truncated lenses, as they are known today, must be truncated flat and not be tapered toward or away from the eye. The invention set forth herein illustrates innovative variations on this theme to provide for a multifocal lens of superior performance.

There are other bifocal contact lenses which are presently in use today, but these lenses have not met with very wide commercial acceptance or have been custom designed for individuals, and are, therefore, most expensive to manufacture.

SUMMARY OF THE INVENTION

The present invention relates to a new and novel bifocal contact lens featuring superior vision, comfort, centration, and stabilization characteristics, also applicable to torics.

The novel bifocal contact lens set forth and claimed herein is of the alternating vision variety. It features a prism ballasted peripheral edge portion which incorpoates a structural vent. The vent is structured to partially release the constrictive engagement between the lens and the eye. The lens may properly position itself on the eye during near vision without depending on the blunt edge contact with the lower lid margin. The vent is beveled so that the lens may be positioned at or below the inferior lid in normal distance gaze. The lens will not substantially move with the eye during downgaze, but will relocate on the eye to position the near segment of the lens before the pupil. The lens has a stabilizing portion adjacent each side of the vent. The stabilizing portions engage the inferior lid during downgaze and blinking to stabilize the lens by correcting torque exerted on the lens. The lens, therefore, will not adversely rotate off axis.

The bifocal contact lens is preferably fabricated from a material normally used in soft contact lenses and, as such, it may be formed on a lathe or molded or spin cast. It is also anticipated that the lens could be produced from a hard lens material.

BRIEF DESCRIPTION OF THE DRAWINGS

FIGS. 7a–h are illustrative alternative embodiments of contact lenses produced according to the principles of this invention; and FIGS. 8 and 9 are views of the contact lens shown in FIG. 6 positioned on the eye.

DETAILED DESCRIPTION OF THE PREFERRED EMBODIMENT

Figure 1:
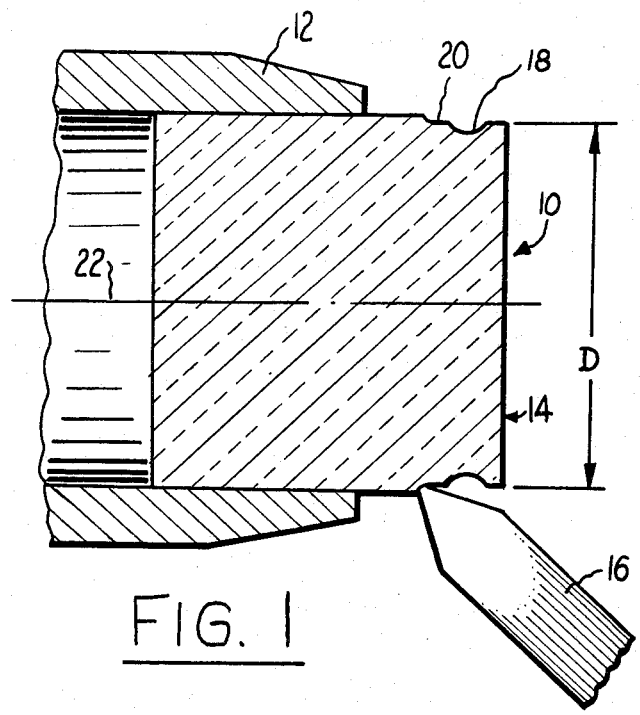
FIG. 1 is a sectional view of a contact lens button held in a chuck and being machined to dimension.

The lens button 10, as shown in FIG. 1, is provided in a rough dimensioned form which is mounted to collet 12 of (not shown) and has been face cut across posterior surface 14 by tool 16 to provide an accurate reference surface from which to work. The lens button 10 is then turned in the lathe and cut by tool 16 to achieve the desired diameter "D" which is equivalent to the approximate dry finished diameter of the lens being produced. A shallow groove 18 is provided in edge 20 adjacent surface 14 to make the lens more comfortable to wear as will be evidenced later in this description.

Figure 2:
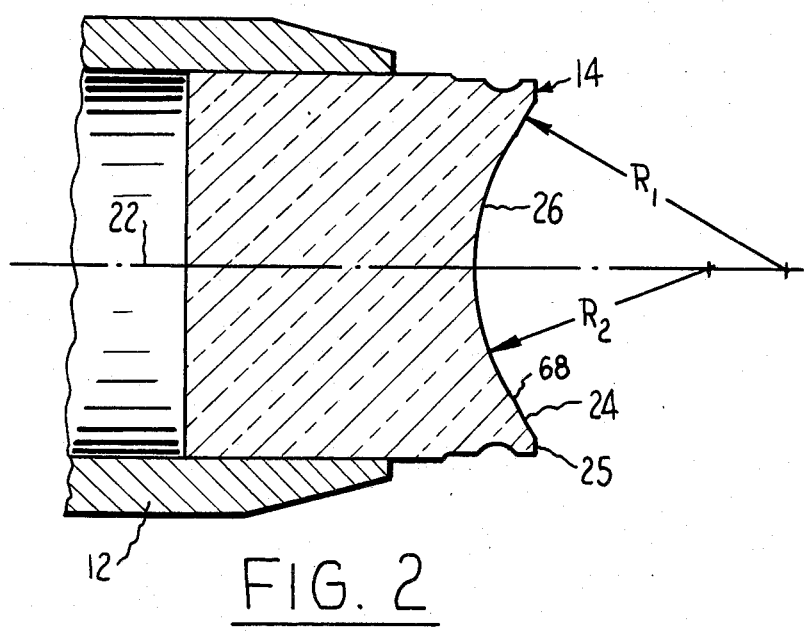
FIG. 2 is a sectional view showing the contact lens button of FIG. 1 having peripheral and base curves cut therein.

Tool 16 is now centered with respect to the geometric center axis 22 of lens button 10, as shown in FIG. 2, and a radius "$R_1$", which is equal to the radius of curvature of the peripheral curve 24, is cut into surface 14. The tool 16 is then repositioned and a second radius "$R_2$" equal to the radius of curvature of the base curve 26 is cut. The base curve 26 is dimensioned to provide the best fit to the curvature of the patient's cornea. The peripheral curve generally aids the practitioner in obtaining proper fit for the patient. Thereafter, the peripheral curve 24 and the base curve 26 are polished by any appropriate and well known manner.

Figure 3:
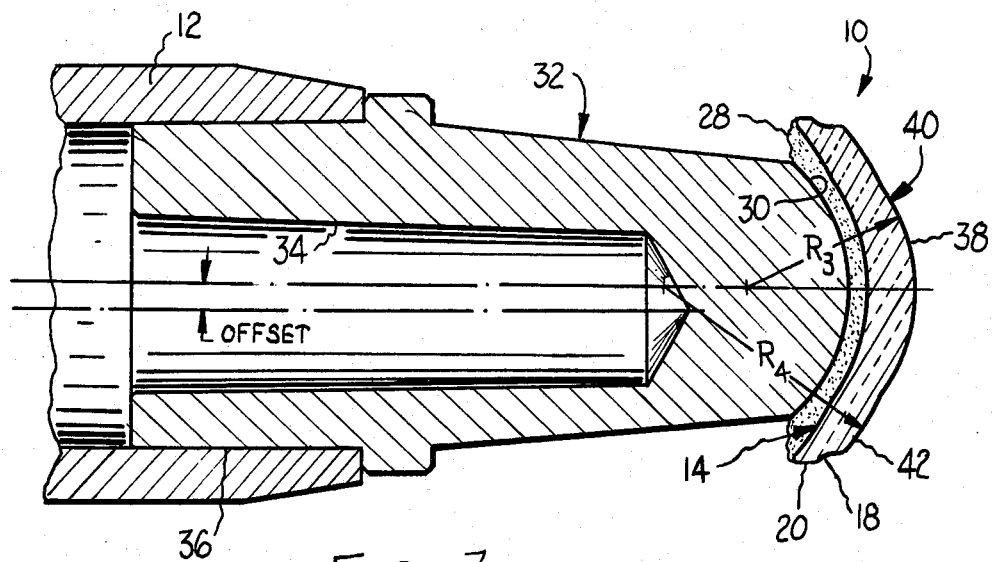
FIG. 3 is a sectional view of the contact lens button of FIG. 2 being provided with "add" and "add" carrier surfaces.
Figure 4:
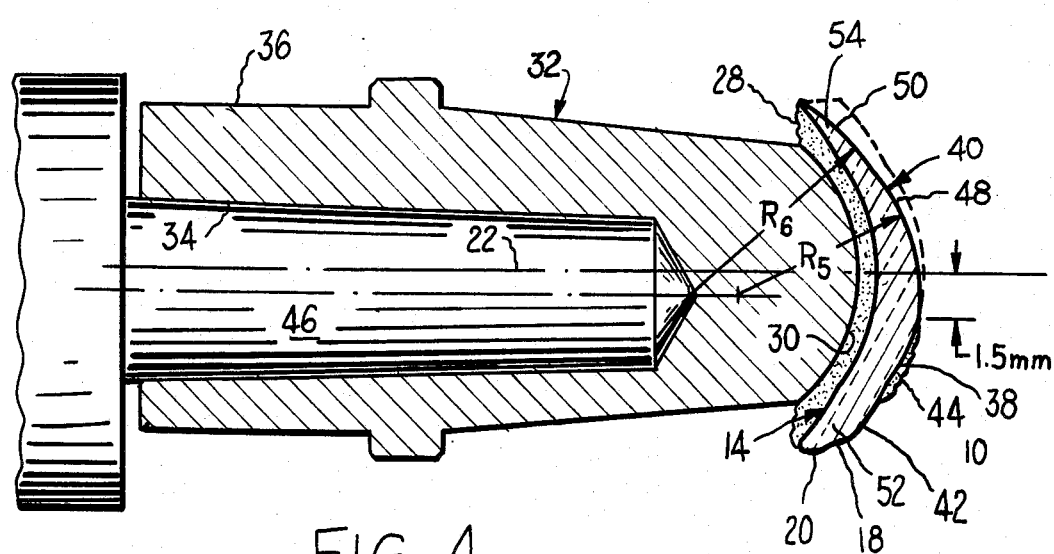
FIG. 4 is a sectional view of the contact lens of FIG. 3 being coated with a protective substance and provided with "distance" and "distance" carrier surfaces.
Figure 6:
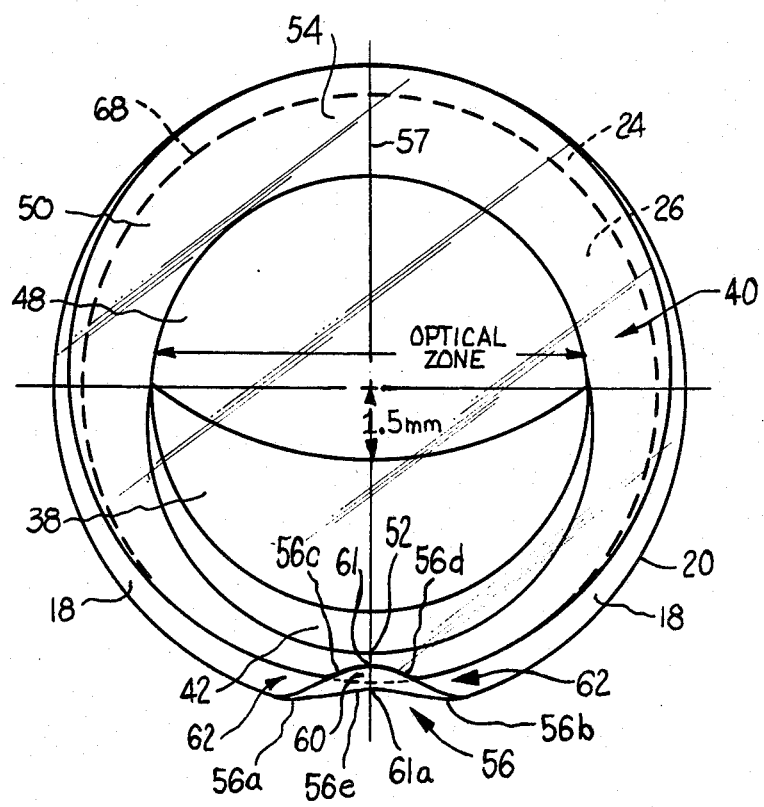
FIG. 6 is a front view of the contact lens of FIG. 5.

The lens button 10 is thereafter mounted with an appropriate substance 28, such as dental wax, to accommodating surface 30 of arbor 32. Arbor 32 has an internal taper 34 which is offset from center 22. The significance of the offset will become fully evident later in this description. Stem portion 36 of arbor 32 is mounted to collet 12 and a radius "$R_3$", which is equal to the "add" power curvature 38, is cut on anterior surface 40 of lens button 10. This radius is equal to the diopter correction necessary to provide the near vision required by the patient and also to provide diameter necessary for the optical zone, as seen in FIG. 6. A further radius "$R_4$", equal to the radius of the "add" carrier curvature 42, is then cut. This radius is such that it will intersect the groove 18, as best seen in FIGS. 3 and 4. The "add" power and "add" carrier surfaces 38 and 42, respectively, as well as groove 18, are then polished by any appropriate method.

Figure 5:
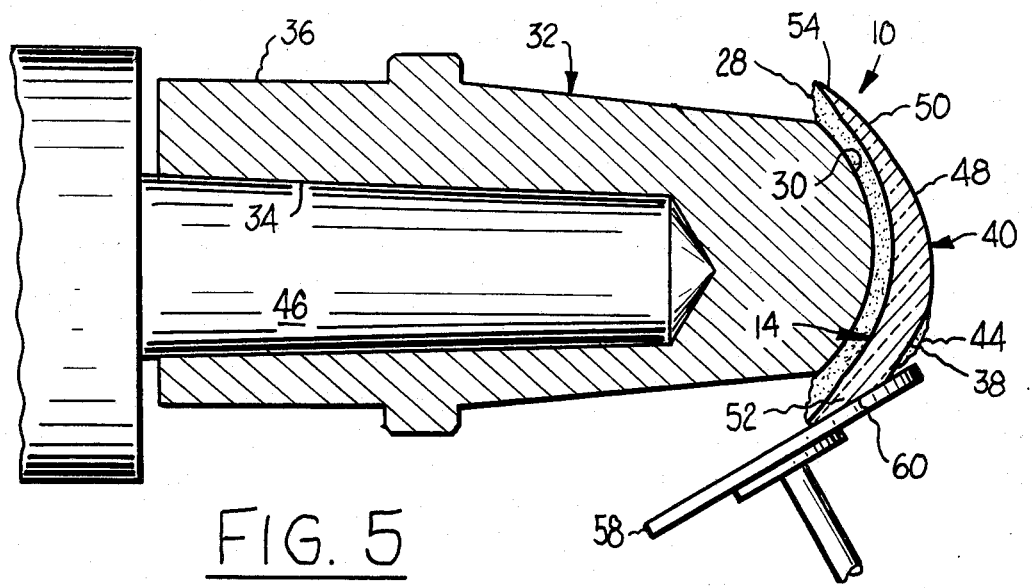
FIG. 5 is a sectional view of the contact lens of FIG. 4 having a structural vent ground therein.

A coating 44 is applied to the polished surface 38 and allowed to dry. The coating 44 will protect these surfaces during later polishing procedures. Arbor 32, as illustrated in FIG. 4, is then mounted via offset internal taper 34 to accommodating taper pin 46 which is fixed to the lathe collet 12. When the lens 10 is rotated by lathe collet 12, it will rotate off-center an amount equal to the off-set of taper 34. Therefore, when cutting a radius "$R_5$", which is equivalent to the diopter correction for the "distance" power curve 48, the cut will remove more material from the portion of the lens which is above the horizontal centerline, as seen in FIGS. 4 and 5, than from the lower portion of the lens. The tool is set to cut an arc on the anterior surface 40 sufficient to provide the necessary diameter for the optical zone, as seen in FIGS. 4 and 6. The cut will extend approximately 1.5 mm below the geometric center 22 of the lens button 10, as seen in FIG. 6 so that the size of the corrective "distance" surface is appropriate to permit normal distance vision without having any "add" surface impinge in the field of view.

A radius "$R_6$", which is equal to the curvature of the "distance" carrier 50, is then cut from the optical zone of the "distance" power curve 48 outward toward edge 20. The groove 18 which was cut into the edge 20 will be partially removed during this cut, but a portion will remain toward the ballasted part of the lens, as best seen in FIG. 6. The surfaces of the "distance" power 48 and the "distance" carrier 50 and the remaining portion of groove 18, which now, because of machining and polishing has the appearance of a chamfer, are thereafter polished by any appropriate manner.

It will be evident from FIG. 4 that the lens 10 is constructed so as to incorporate prism ballast and accordingly, has a thicker bottom portion 52, as seen in FIG.4, than upper portion 54. As is well known, incorporating prism ballast in a contact lens aids in keeping the lens accurately positioned on the cornea of the eye. However, prism ballast, while helping to cure some problems produces others which must be compensated for. In order to provide for lens mobility and to alleviate the problem of wearer discomfort described earlier in the description of the prior art, a structural vent 56 is ground by rotating abrasive disc 58 into the lens 10. Obviously, should the lens be molded or cast rather than lathed, the vent 56 could be provided by molding. However, for this description, and for the lens shown, the vent 56 is ground into the lens at an angle of approximately 30° to the edge 20, as best seen in FIG. 5. The grinding angle is selected to offer the most comfortable fit to the patient and to aid in the upward movement of the lens during downgaze. Also, the depth the vent is ground into the lens is selected to offer the greatest degree of wearer comfort without having adverse effect on the strength of the lens. However, it should be noted that the suggested vent angle of 30° is given by way of example only and may be varied according to the parameters of the lens being produced. Further, lens 10 may be held stationary as shown in FIG. 5 or it may be moved linearly with respect to the rotating disc 52. The vent 56 is now polished by any appropriate method, and the coating 44 removed, the groove 18 also is polished at this time.

FIG. 6 is a front view of a completely finished lens 10, in its final configuration. As the rotating disc 58 is flat, and the lens 10 is substantially spherical, the vent 56 will have a wedge surface 60 which will taper (a) outwardly from the vertical centerline 57 (as seen in FIG. 6) toward the edge 20 and (b) from the anterior surface 40 toward the posterior surface 14 (as seen in FIG. 5). The shape of the resulting vent 56 resembles a flattened crescent with reversed and peaked ends 56a and 56b, or, in other words, an isosceles triangle which is rounded between the short equal legs 56c and 56d, has an inward curvature along its longest leg 56e and fluted junctures 56a and 56b between the long and short legs.

The periphery of the lens, substantially defined by edge 20, according to the principles of the present invention is defined by the juncture of the anterior substantially convex surface 40 and the posterior substantially concave surface 14 for the greater portion of the lens periphery. The balance of the periphery is defined by an edge surface 60 extending between the anterior surface 40 and the posterior surface 14 and is of varying width. The edge surface 60 is symmetrical about the vertical axis 57 of the lens 10 when disposed on the eye and the surface merges symmetrically on opposite sides of the vertical axis 57 with the periphery of the lens defined by the anterior and posterior surfaces. The edge surface 60 has its longest dimension between the anterior and posterior surfaces proximate the lens vertical axis 57. Further, anterior and posterior surfaces are spaced farthest from each other proximate the vertical axis 57 of the lens when measured along the edge surface 60. The boundary of the edge surface 60 closest to the center of the lens is defined by the juncture 61 between the edge surface 60 and the substantially convex anterior surface 40. The boundary of the edge surface 60 farthest from the center of the lens is defined by the juncture 61a between the edge surface 60 and the substantially concave posterior surface 14.

As a result of grinding vent 56, stabilizing zones 62 are formed on the lens 10 adjacent each side of the vent 56. One of the stabilizing zones will be positioned when the lens is being worn relative to the nasal orientation, the other stabilizing zone will be positioned when the lens is being worn relative to temporal orientation. During either the blink sequence of downgaze, the inferior lid 64, as seen in FIGS. 8 and 9, encounters surface 60 of vent 56 and the adjacent stabilizing zones. As the surface 60 of vent 58 is tapered, the lens is allowed to position itself comfortably at, or below, the inferior eyelid 64. The stabilizing zones 62 adjacent the vent 56 are positioned to aid the lens in maintianing its correct position on the eye by their engagement with the lower eyelid 64. For instance, if for any reason the lens 10 were to rotate off-axis temporally, the stabilizing zone 62 on the nasal side would encounter the lower lid 64. This encounter would impart torque to the lens 10 through the combined movement of the eye and the lid and would rotate it back until the temporal stabilizing zone 62 encounters the lower eyelid 64. The torque upon the lens is thereby continually equalized, and maintains proper position on the eye during distance gaze.

In FIG. 8 the lens 10 is schematically shown positioned on the eye for distance vision. It will be evident that surface 60 is tapered such that a portion of it may be comfortably positioned below the lower eyelid 64. As the eye is rotated downward to shift from distance gaze, shown in FIG. 8, to near gaze, shown in FIG. 9, the lens 10 will move with the eye only to such a point where the force exerted by the lower lid 64 against the lens overcomes the frictional engagement between the eye and the lens. At that point, the lens will establish, and maintain, its selected position. The eye, however, will continue to move until the pupil is aligned with the near vision segment 38, also referred to as the "add". When the field of vision is shifted back to distance, the prism ballasting feature returns the lens to its proper distance vision position.

FIGS. 7a–f are schematic views showing the new bifocal contact lens 10. FIG. 7a depicts a shallow structural vent 70 being in lens 10. FIG. 7b is a front view of the resulting lens. FIGS. 7c and 7d show a lens 10 which has a vent 56b of medium depth while FIGS. 7e and 7f show lens 10 with a deep vent 74. It will be appreciated, that the size and shape of the lens vent is dependent upon how much lens material is removed by disc 58 during the grinding process. Also, it should be noted, that the shape and size of the vent 56 is dependent upon the range of base curves used and the diameter of the lens being supplied.

It should be noted that in one embodiment which has had good practical results, the amount of material removed would not be so great as to impinge across the boundary between the peripheral curve 24 and the base curve 26. That is, some of the peripheral curve surface 24 should remain after the vent 56 is ground. If, for instance, the vent 56 were to be ground by disc 58 so that it impinged from the peripheral curve 24 across the constrictive ring 68 and into the base curve 26, the lens 10 would lose much of its desired ability to maintain position on the eye. This is due in part to the constrictive engagement between the eye and the outer periphery, or edge 20, and in part to the constrictive ring 68 which is formed by the juncture of the peripheral curve and base curve.

FIGS. 7g and 7h are schematic views which show further representations of a contact lens 100 produced according to the principles of the present invention. FIG. 7g shows contact lens 100 where in the surface 102 of the structural vent 104 is convex. FIG. 7h shows a lens 100 which features a concave surface 106 on structural vent 108. There are, of course, many other variations which are possible.

In the above described embodiments, it is evident that the structural vent 58 is ground directly into the lens 10 which thereby provides a form of truncation. However, it is anticipated that in some instances it may be preferable to first truncate the lens and then to grind in the vent or to mold a truncated, as well as a vented lens. Further, the lens described herein has a bicurve posterior surface, although in some instances it may be very desirable to produce a mono-curve lens. Still further, the example set forth herein is directed toward a lens which is produced from a soft material, and as such, it will be appreciated that all references to diameters and radii, etc., refer to dimensions in the dry states and these dimensions will accurately convert to finished lens dimensions when the lens is hydrated. It should be appreciated that is the lens is produced from a hard material the dimensions will not have an expansion factor.

We claim:

1. A prism ballasted contact lens comprising:
   a posterior surface having a substantially circular boundary;
   an anterior surface; and
   a peripheral edge zone contiguous with said posterior and anterior surfaces, said peripheral edge zone being configured to define a stabilizing and vent zone in the prism ballast area, having two thickened stabilizing portions spaced from each other by a substantially flat vent surface which tapers from said anterior surface toward said posterior surface and which intersects said posterior surface along an arcuate line of curvature reverse to the curvature of the substantially circular boundary of the posterior surface, said vent surface partially releasing constrictive engagement between said lens and the eye, said stabilizing portions stabilizing said contact lens and preventing said lens from rotating on the eye of the wearer.

2. The contact lens as set forth in claim 1, wherein said peripheral edge zone is substantially circular and said stabilizing and vent zone comprises approximately 10% of said peripheral edge zone.

3. The contact lens, as set forth in claim 1, wherein said vent surface is concave.

4. The contact lens, as set forth in claim 1, wherein said vent surface is convex.

5. A prism ballasted contact lens for predetermined orientation on the human eye and for stabilization relative to the vertical meridian of the eye at the position of predetermined orientation, comprising:
   a posterior lens surface of substantially concave configuration;
   an anteriro lens surface of substantially convex configuration disposed in a relationship to the posterior lens surface to define the lens body therebetween and joining the posterior lens surface to substantially define the periphery of the lens, and with the anterior lens surface being configured to form a wedge section at the area of the lens having the most prism ballasting for providing for predetermined orientation of the lens and for stabilization of the lens at the position of predetermined orientation, the wedge section being defined by the body of the lens and by two convex anterior surface areas separated by a wedge edge surface extending from the anterior lens surface substantially to the posterior lens surface proximate the periphery of the lens, the wedge edge surface being of varying width for positioning substantially symmetrically about the vertical meridian of the eye and the wedge edge surface being widest substantially at that area of the lens for positioning at the vertical meridian of the eye.

6. A prism ballasted contact lens having posterior and anterior surfaces, for orientation on the eye of a human with respect to the vertical and horizontal meridians thereof, said lens comprising:
   at least one vision correcting surface on said anterior surface;
   a vent including a vent surface for providing a structural relief in said lens at the most prominent portion of the prism ballasting for releasing the constrictive engagement between the eye and the posterior surface of said contact lens, said vent surface tapering in one direction from a first location on the anterior surface between the geometrical center of the lens and the edge thereof toward, and at least to, the posterior surface of said lens at the edge thereof, said vent surface further tapering horizontally away from the first location on the anterior surface toward and at least to the posterior surface at the edge of said lens, said vent enabling said lens to move on the eye; and
   a distinct stabilizing portion adjacent each side of said vent for engagement with the inferior lid of the eye, said stabilizing portions by engaging the inferior lid during movement of the eye counteracting unwanted rotational torque exerted upon said lens, and thereby assuring that said lens maintains true position on the eye.

7. A prism ballasted contact lens having vertical and horizontal axes associative with the vertical and horizontal meridians of the eye to which it is mounted and movable along the vertical meridian between first and second locations, said lens comprising:
   posterior and anterior surfaces contiguous with a peripheral edge surface; and
   structural vent means provided in the prism ballasted portion of said lens for releasing constrictive engagement between said lens and the eye, said structural vent means having a surface which tapers both vertically and horizontally from a point on said anterior surface through said ballasting portion and intersecting said peripheral edge surface thereby providing a thickened portion on each side of said structural vent means, which when viewing said lens in its position on the eye, has an appearance resembling a modified crescent, said structural vent means enabling said lens to move along the vertical meridian of the eye between first and second locations relative to movement of the eye and the thickened portions stabilizing the lens upon the eye during such movement.

8. The method of making a prism ballasted contact lens, comprising the steps of:
   (a) providing a peripheral edge surface on said lens,
   (b) forming posterior and anterior surfaces on said lens such that said lens has a prism ballasted area;
   (c) forming a stabilizing and vent zone on said lens at the prism ballasted area thereof which includes two distinct stabilizing portions spaced from each other by a substantially flat vent surface which tapers from said anterior surface toward said posterior surface.

9. The contact lens manufactured according to the method set forth in claim 8.

* * * * *